(No Model.) 9 Sheets—Sheet 1.

S. M. HOTCHKISS.
MANUFACTURE OF BARREL BODIES FROM PULP.

No. 318,742. Patented May 26, 1885.

Witnesses
W. M. Bjorkman
H. R. Williams

Inventors
Samuel M. Hotchkiss
by Simonds & Burdett,
Attys.

(No Model.) 9 Sheets—Sheet 3.

S. M. HOTCHKISS.
MANUFACTURE OF BARREL BODIES FROM PULP.

No. 318,742. Patented May 26, 1885.

Witnesses
W. M. Bjorkman
H. R. Williams

Inventor
Samuel M. Hotchkiss
by Simonds & Burdett,
Attys.

(No Model.) 9 Sheets—Sheet 4.
S. M. HOTCHKISS.
MANUFACTURE OF BARREL BODIES FROM PULP.
No. 318,742. Patented May 26, 1885.
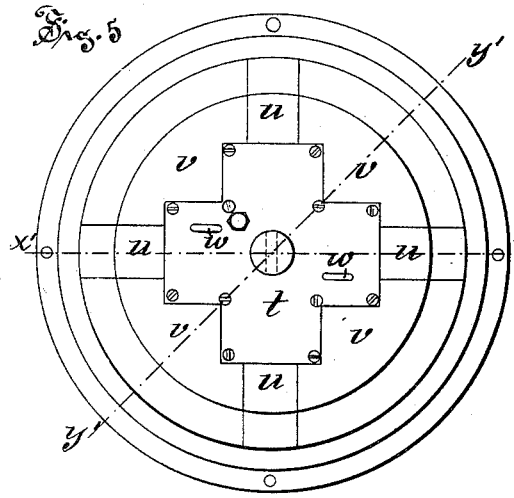
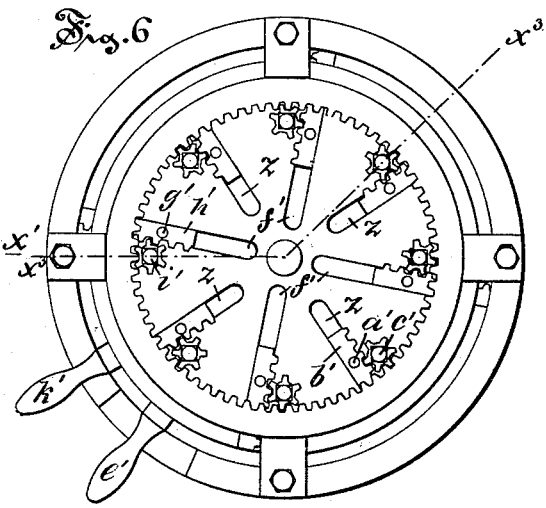
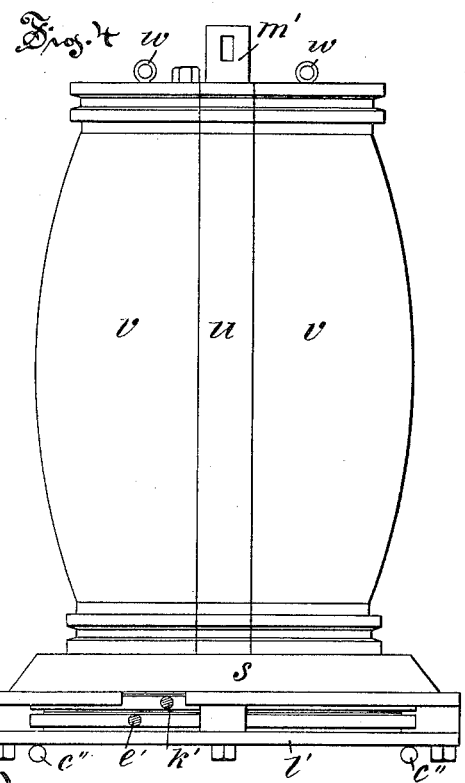
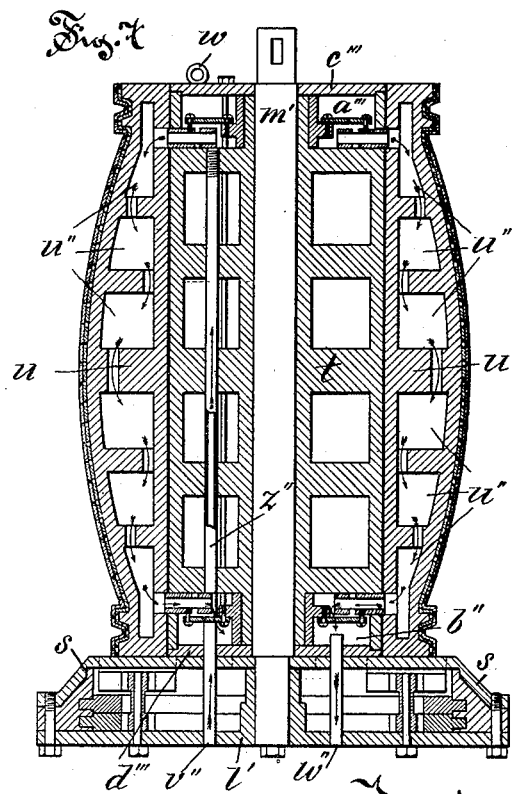
Witnesses
W. M. Perkman
H. R. Williams
Inventor
Samuel M. Hotchkiss
by Simonds & Burdett
attys.

(No Model.) 9 Sheets—Sheet 5.

S. M. HOTCHKISS.
MANUFACTURE OF BARREL BODIES FROM PULP.

No. 318,742. Patented May 26, 1885.

Witnesses.
W. M. Bjorkman.
H. R. Williams.

Inventor.
Samuel M. Hotchkiss
by Simonds & Burdett,
Attys.

(No Model.) 9 Sheets—Sheet 6.
S. M. HOTCHKISS.
MANUFACTURE OF BARREL BODIES FROM PULP.
No. 318,742. Patented May 26, 1885.
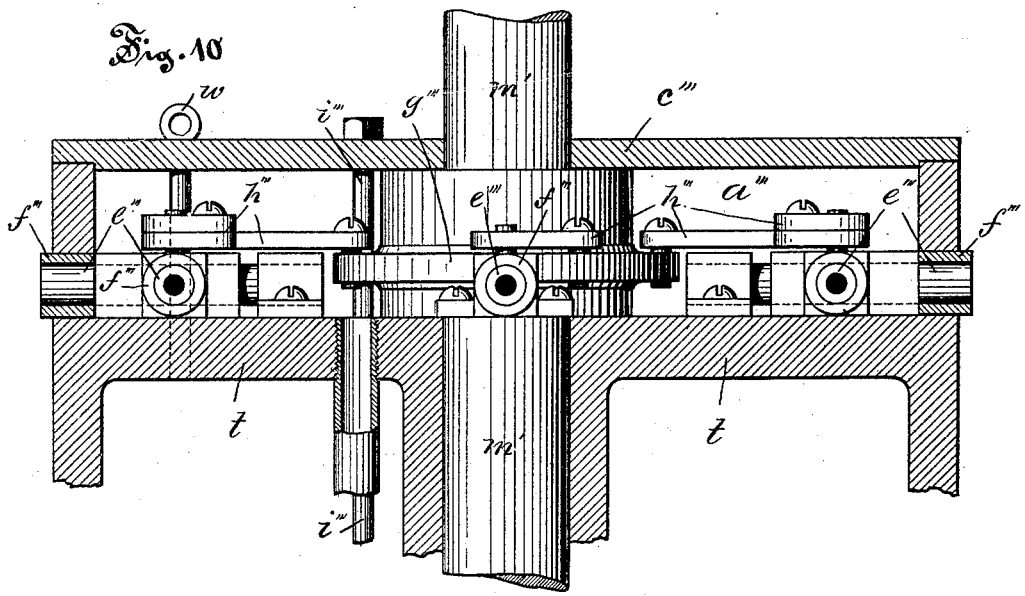
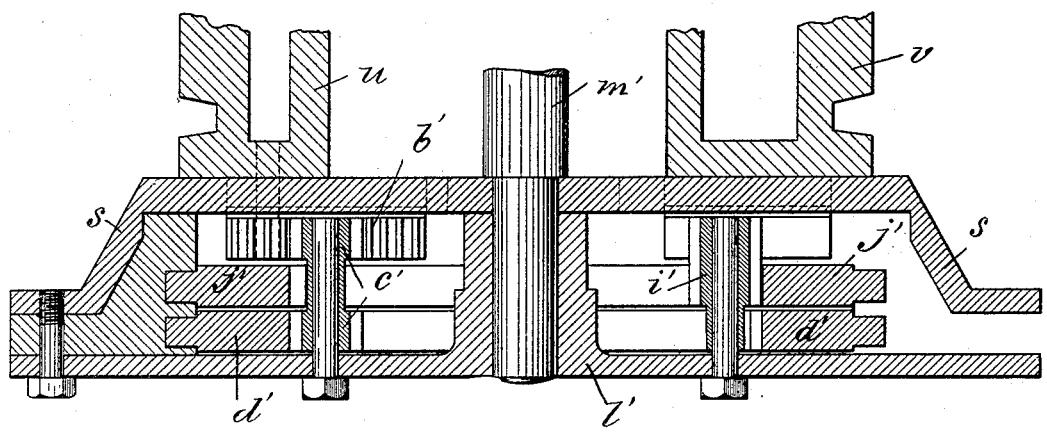
Witnesses
W. M. Bjorkman
H. R. Williams
Inventor
Samuel M. Hotchkiss
by Simonds & Burdett,
Attys.

(No Model.) 9 Sheets—Sheet 7.
S. M. HOTCHKISS.
MANUFACTURE OF BARREL BODIES FROM PULP.
No. 318,742. Patented May 26, 1885.
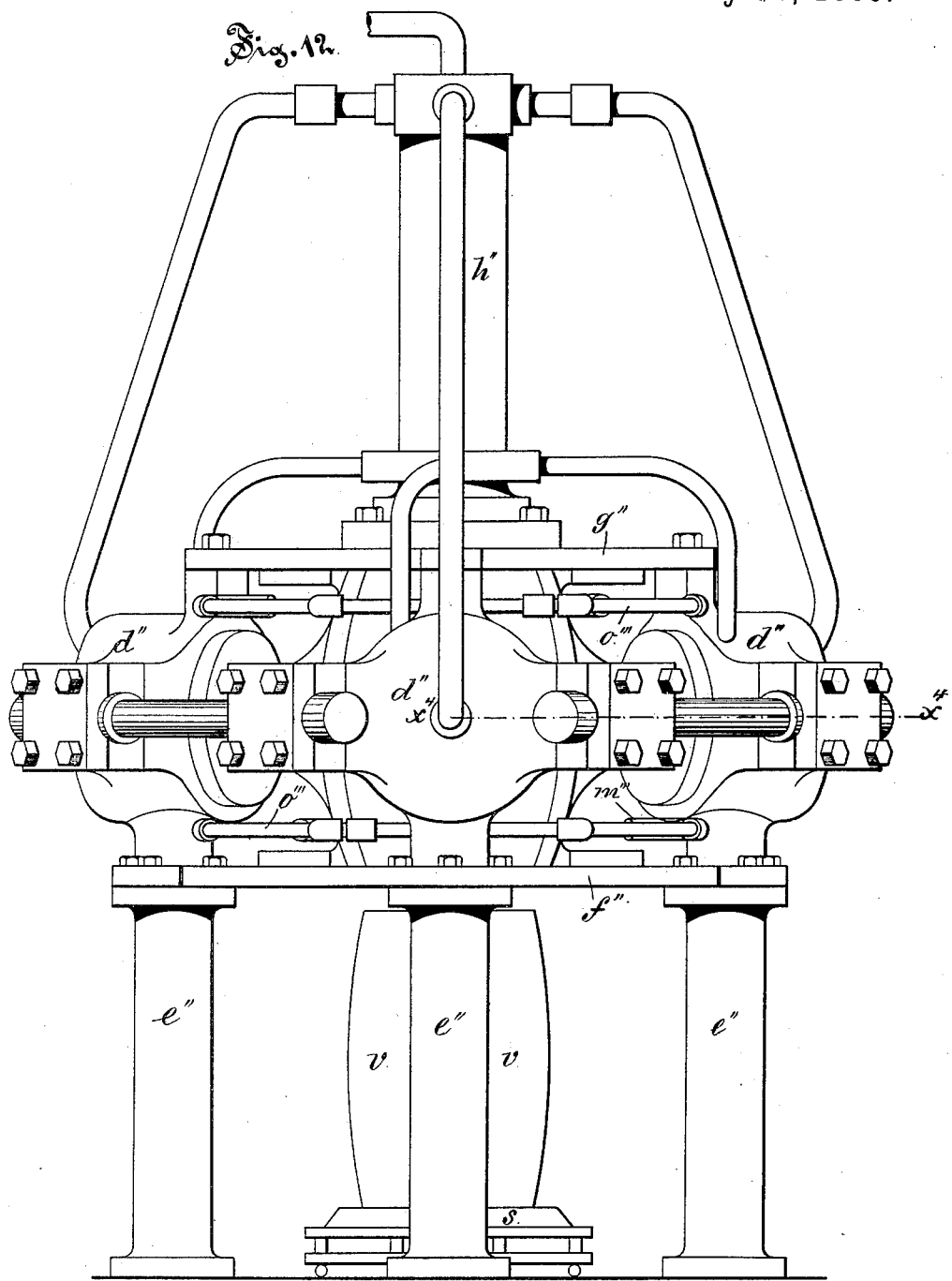

(No Model.) 9 Sheets—Sheet 8.

S. M. HOTCHKISS.
MANUFACTURE OF BARREL BODIES FROM PULP.

No. 318,742. Patented May 26, 1885.

Witnesses
W. M. Bjorkman
H. R. Williams

Inventor
Samuel M. Hotchkiss
by Simonds & Burdett,
Attys.

(No Model.) 9 Sheets—Sheet 9.
S. M. HOTCHKISS.
MANUFACTURE OF BARREL BODIES FROM PULP.
No. 318,742. Patented May 26, 1885.
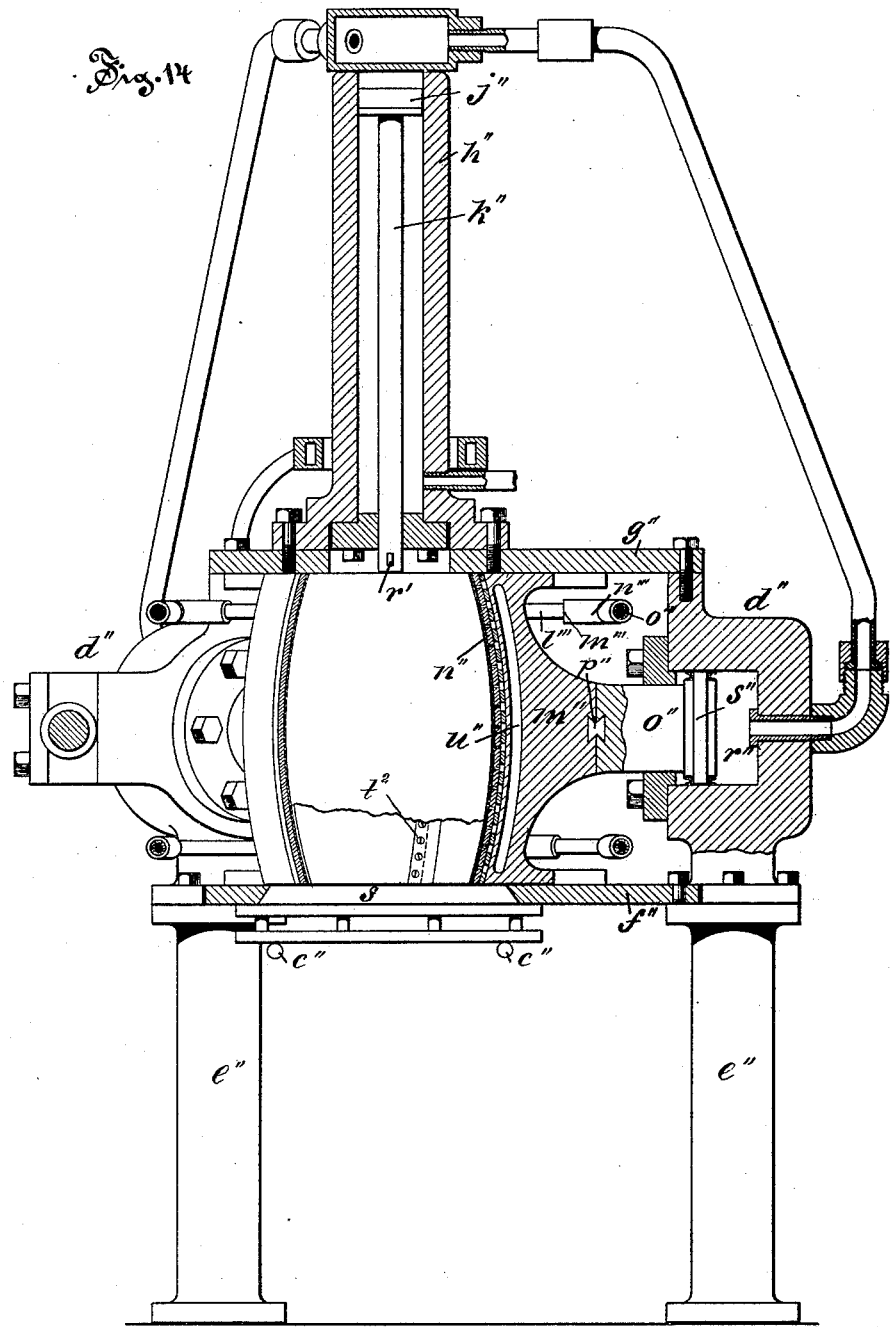
Witnesses
W. M. Bjorkman.
H. R. Williams.
Inventor
Samuel M. Hotchkiss
by Simonds & Burdett,
Attys.

UNITED STATES PATENT OFFICE.

SAMUEL M. HOTCHKISS, OF HARTFORD, CONNECTICUT.

MANUFACTURE OF BARREL-BODIES FROM PULP.

SPECIFICATION forming part of Letters Patent No. 318,742, dated May 26, 1885.

Application filed January 24, 1885. (No model.)

*To all whom it may concern:*

Be it known that I, SAMUEL M. HOTCHKISS, of Hartford, in the county of Hartford and State of Connecticut, have invented a certain new and useful Improvement Pertaining to the Manufacture of Barrel-Bodies and the like from Pulp, of which the following is a description, reference being had to the accompanying drawings, where—

Figure 1:
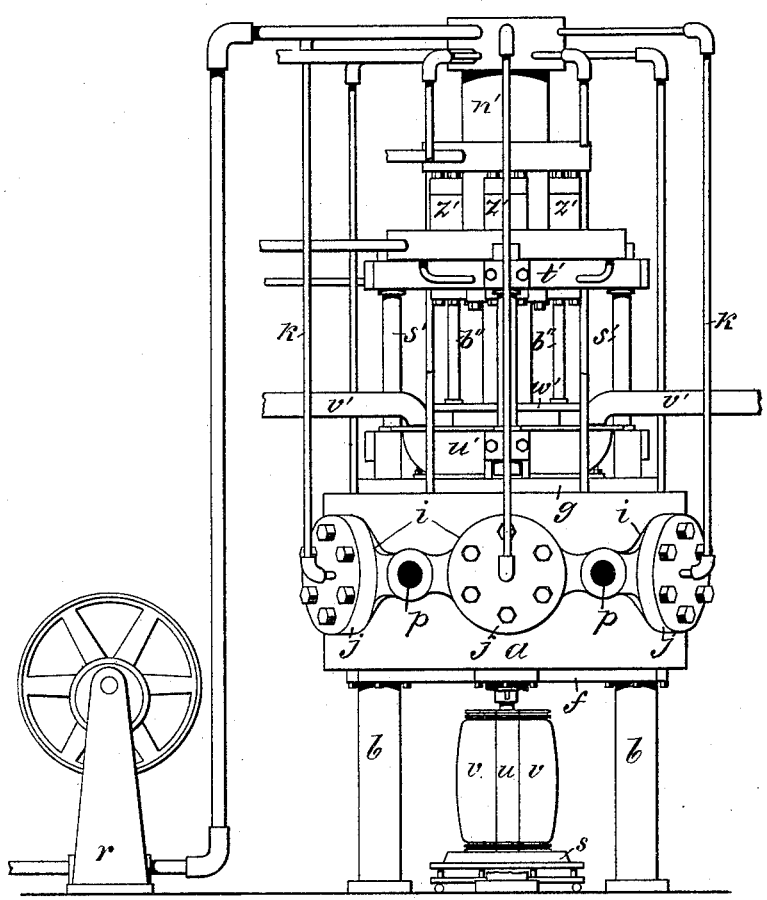
Figure 2:
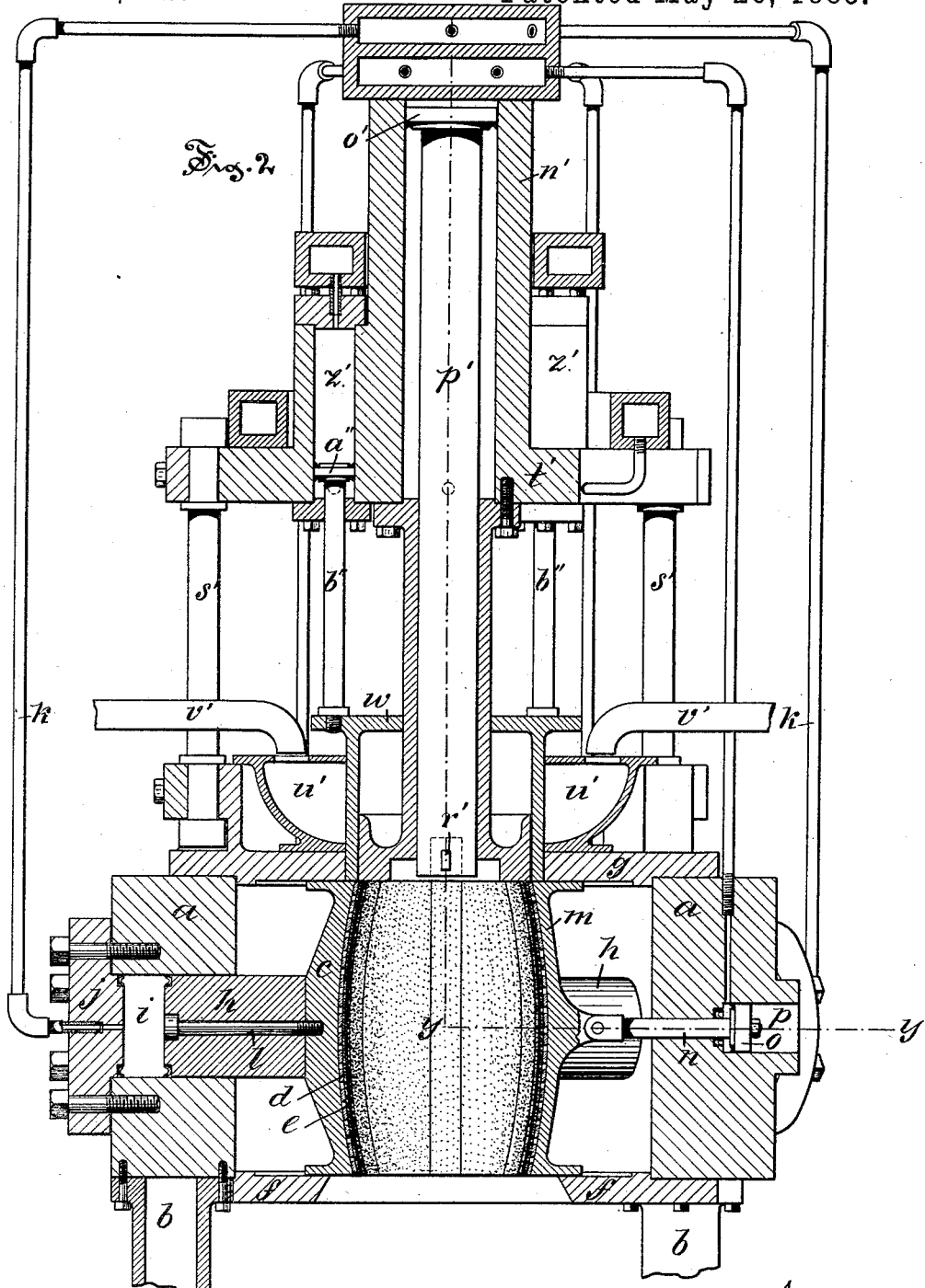
Figure 3:
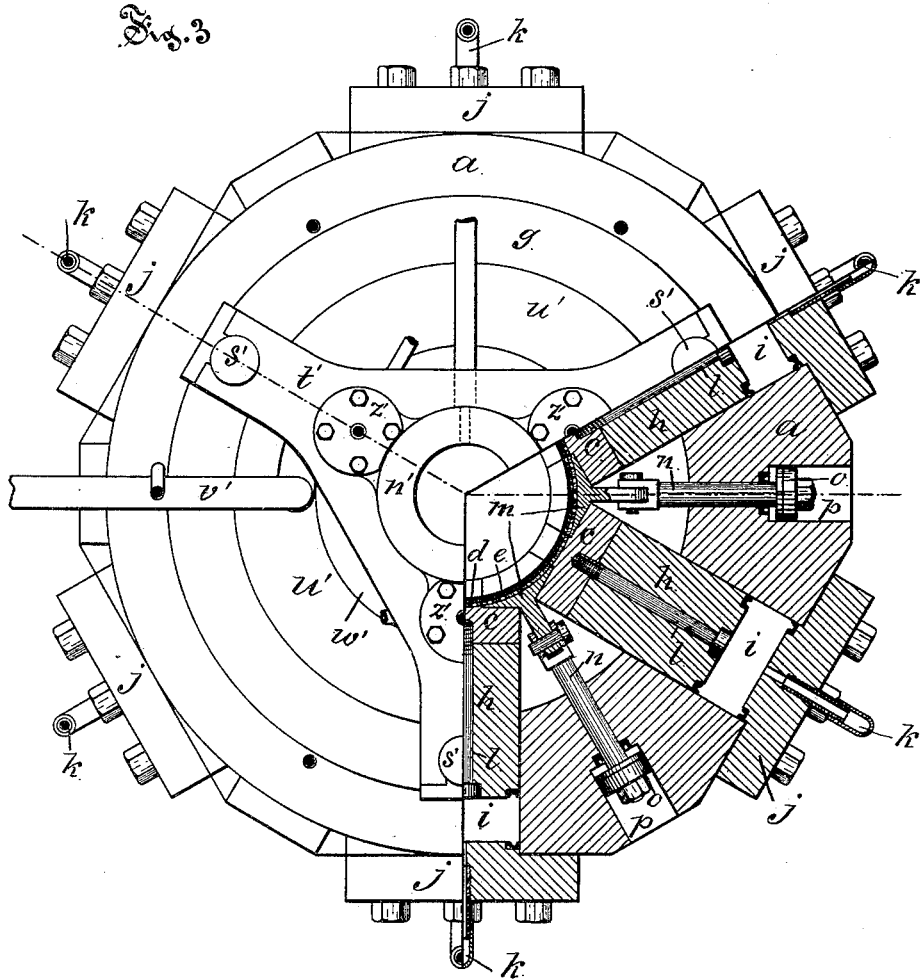
Figure 9:
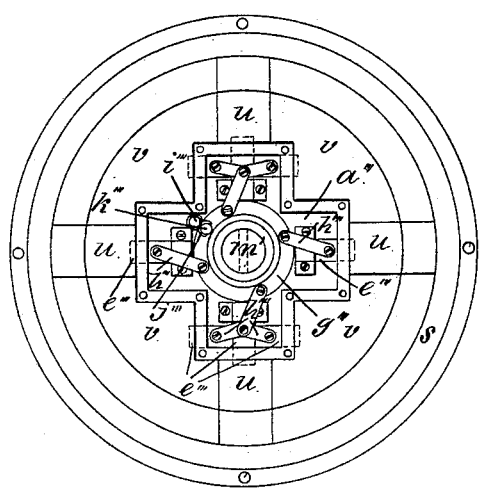
Figure 8:
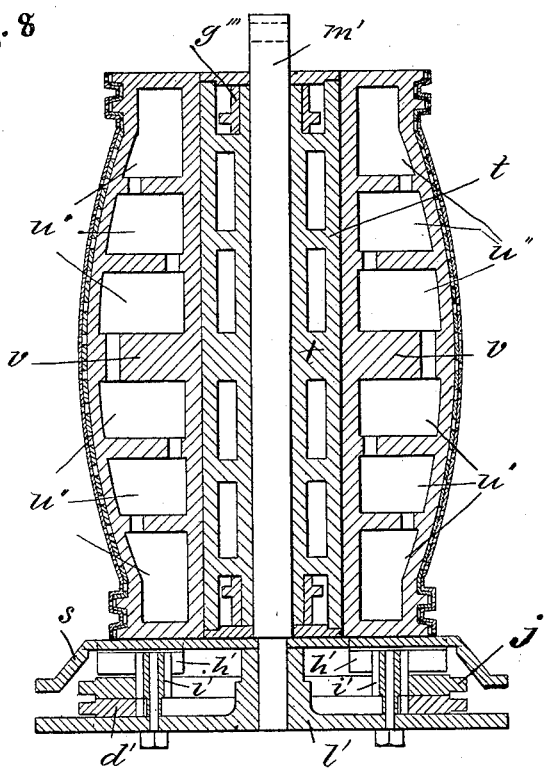
Figure 13:
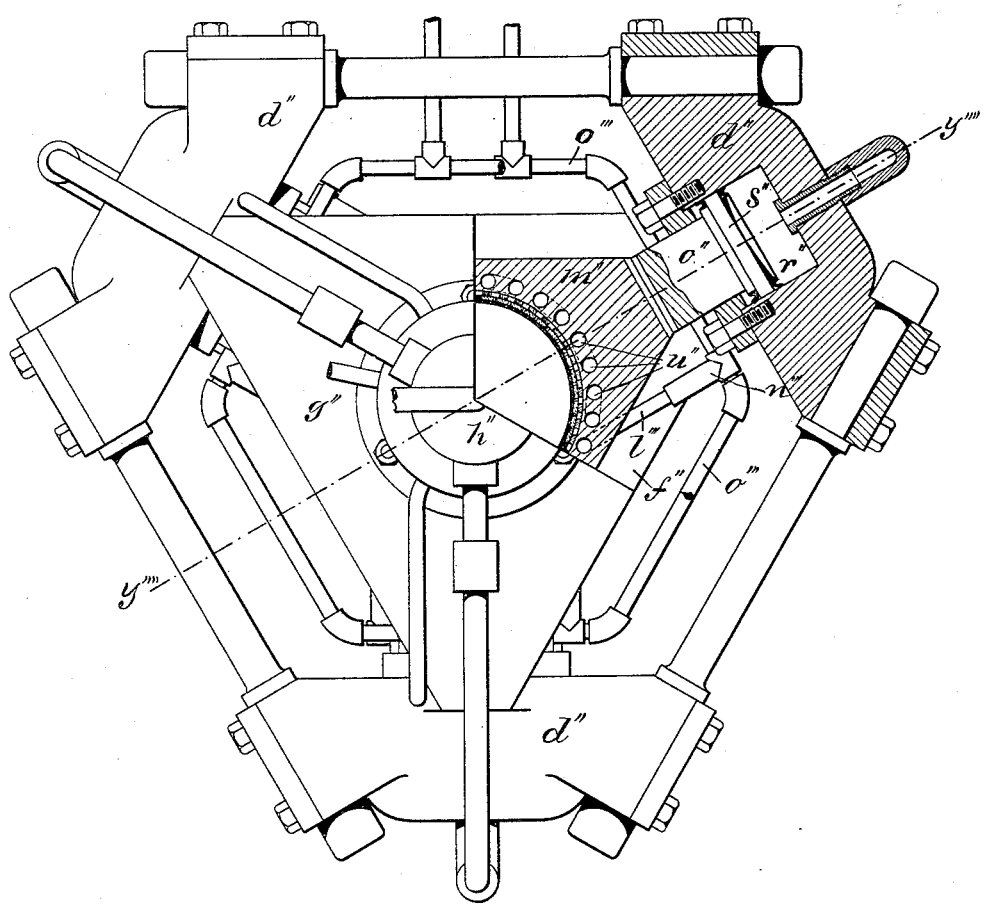

Figure 1 is an elevation view of the machine for forming and compressing a barrel-body, with the core underneath attached to its lifting-rod and ready to be raised. Fig. 2 is a sectional elevation of the machine shown in Fig. 1, scale enlarged, the planes of the section being indicated by the dotted line $x\ x$, seen in Fig. 3. The section is on two different planes which meet at the vertical center of the machine. The core is omitted from this view. Fig. 3 is a top or plan view of the machine shown in Fig. 1, scale enlarged, with a part in horizontal section on the plane indicated by the dotted line $y\ y$, seen in Fig. 2. The core is omitted from this view. Fig. 4 is an elevation view of the core, scale enlarged as compared with Fig. 1. Fig. 5 is a top or plan view of the core shown in Fig. 4. Fig. 6 is a view of the bottom of the core shown in Fig. 4, with the covering-plate, which is at the extreme lower end, removed. Fig. 7 is a view of the core shown in Fig. 4 in vertical section on plane denoted by the dotted line $x'\ x'$, seen in Fig. 5. The plane $x'\ x'$ cuts the core-sections. Fig. 8 is a view of the core shown in Fig. 4 in vertical section on the plane denoted by the dotted line $y'\ y'$, seen in Fig. 5. The sectional plane cuts the core-blocks. Fig. 9 is a top or plan view of the upper end of the core, with the covering-plate of the steam-chest removed, so as to show the mechanism inside the steam-chest. Fig. 10 is an enlarged detail view of the steam-chest in the upper end of the core. The view is in central vertical section, so far as the steam-chest itself is concerned, but is a side view of the machinery inside the steam-chest. Fig. 11 is an enlarged detail view of the parts at the lower end of the core. It is a view in vertical section on two different planes meeting at the vertical center of the core. These two planes are denoted by the dotted line $x'''\ x'''$, seen in Fig. 6. Fig. 12 is an elevation view of the machine for drying the barrel-body, with the core underneath carrying a barrel-body previously formed thereon. Fig. 13 is a plan view of the machine shown in Fig. 12, with one-third thereof shown in horizontal section on the plane denoted by the dotted line $x''''\ x''''$, seen in Fig. 12. Fig. 14 is a view of the machine shown in Fig. 12 in vertical section on the plane denoted by the dotted line $y''''\ y''''$, seen in Fig. 13. The core and the barrel-body it carries are not sectioned.

The practical application of this improvement is illustrated and described herein as applied to the manufacture of a barrel-body from pulp; but the improvement is applicable to the manufacture of other articles than barrels. The pulp referred to herein may be the pulp for paper-stock, or pulp of any other material adapted to the purpose in hand. In that mode of making a barrel-body from pulp herein described the barrel-body is first formed in one machine, which compresses the pulp, forming it into the desired shape and largely expressing the water, which barrel-body is then transferred to another machine, where under pressure heat is applied to expel by drying the remainder of the moisture.

Perhaps the heaviest and most conspicuous single feature in the machine for forming barrel-bodies is the frame-ring $a$—an iron casting—which of course might be made in a plurality of pieces, but is better made as one solid casting. A special utility arising from making this ring in one piece is that the hydraulic cylinders $i$, herein described, are all formed in this frame-ring, and are all kept rigidly in line with each other. This frame-ring is or may be supported on pillars $b$. The machinery for forming the barrel-body may be said, in general terms, to be inside of this general frame-work.

The more important features in the forming of the barrel-body are a collapsible core, which forms the interior of the barrel-body, and external side compressors radially movable, which form the exterior of the barrel-body.

The letters $c$ denote the external side compressors, which are preferably, but not necessarily, six in number. They have a movement toward and from the axis of the barrel-body, and this is what is meant by saying that they are "radially movable." These external side compressors are grooved upon their faces for the escape of water as it is expressed from the pulp. These external side compressors are overlaid by the face-plates *d*, which are preferably of boiler-plate. These face-plates are perforated laterally from front to rear for the escape of water expressed from the pulp. These face-plates are overlaid with a finely-perforated mold-face, *e*. When the external side compressors move toward the axis of the barrel-body for the purpose of compressing the pulp and forming it, water which is expressed from the pulp passes through the finely-perforated mold-face *e*, thence through the lateral perforations in the face-plate *d*, and escapes and runs off through the grooves, which are in the external side compressors.

The letter *f* denotes a table, a cast-iron plate supported on the pillars *b* and underneath the frame-ring. The letter *g* denotes a somewhat similar table, which is immediately over the frame-ring. For convenience sake the table *f* is called the "lower table" and the table *g* the "upper table." The external side compressors, already mentioned, are located between these upper and lower tables, and they, as well as the interspace compressors hereinafter mentioned, practically rest and have their radial movement upon the lower table, *f*. There is a raised ring on the upper side of the lower table, *f*, and upon the lower side of the table *g*, radially mortised at appropriate places, in which the ends of the external side compressors and the interspace compressors rest, such mortises forming guides for all these compressors in their radial movement.

The external side compressors are solidly backed by and attached to the pistons *h*, which lie and move in cylinders *i*, formed and bored in the frame-ring *a*. The letters *j* denote cylinder-heads strongly fastened to the frame-ring. These pistons *h* and cylinders *i* form what are commonly known as powerful "hydraulic rams," and their office is to force the external side compressors forward in their radial movement with great power for expressing the water from the pulp and giving it its shape.

The letter *k* denotes the ducts through which water is introduced into the cylinders *i* at appropriate times by a strong hydraulic pump, *r*, in the manner well known for similar purposes.

The letter *l* denotes the screw or bolt which fastens the pistons *h* to the side compressors.

It will be understood that the hydraulic rams mentioned herein are packed and otherwise fitted in the ways and manners that hydraulic rams are usually packed and fitted. The various ducts *k* lead from a common reservoir appurtenant to the pump *r*, so that the pressure may be simultaneous and equal in each one of the hydraulic cylinders *i*, insuring simultaneous and equal pressure on all parts of the barrel-body.

In order to attain a substantially round or circular outline for the barrel body, there are used, in addition to the external side compressors, *c*, other and subsidiary compressors, *m*, which, for convenience sake, are termed "interspace compressors," which are carried forward when the pulp is being compressed and formed by the compressors *c*. These interspace compressors have their radial movement guided in the same way that the compressors *c* are guided. These interspace compressors have a finely-perforated mold-face, the same as the compressors *c*. They are perforated radially from front to rear, the same as the compressors *c*, and they are grooved or ribbed upon the back to facilitate the escape of the expressed water. These interspace compressors are attached on the back to the piston-rods *n*, which have on their outer ends the piston-heads *o*, moving in cylinders *p*, bored and formed in the frame-ring *a*, which cylinders, piston-heads, and piston-rods are packed and fitted in the common ways and manners. Each one of the cylinders *p* is furnished with a duct communicating with a hydraulic accumulator, which avails to retract the interspace compressors and the external side compressors as well, when permitted so to do—that is, when the water-pressure is taken off the pistons *h*. The constant pressure from the accumulator not only avails to retract all the external side compressors in the manner described, but it keeps the interspace compressors always properly in contact with the external side compressors.

It is suggested at this point that a helical spring drawing backward on the interspace compressors may be substituted for the accumulator pressure so far as the said function of keeping the interspace compressors in contact with the compressors *c* is concerned, and that in case the accumulator is dispensed with the pistons *h* may be so made as to have piston-heads, and water-pressure be applied upon the inside thereof, as well as on the other side, in order to retract the external side compressors.

Having in substance described the compressors for forming and compressing the exterior of the barrel-body, attention is now directed to the collapsible core which forms the interior of the barrel-body. This core is spoken of as "collapsible." Evidently the core for a bilged barrel must be collapsible, in order that it may be extricated from the barrel-body after such barrel-body is formed thereon.

The letter *s* denotes what is called the "core-plate." On this core-plate the parts which may be said to form the core proper rest. These parts are nine in number—the part *t*, called the "core-spine," shaped in section substantially like a Maltese cross, the parts *u*, four in number, called the "core-sections," and the parts *v*, four in number, called the "core-blocks."

It will be observed that the core-spine forms a central lateral support for the core-sections and core-blocks, and that the whole construction is a very strong one, to the end that the core, as a whole, may safely withstand the great lateral pressure to which it is subjected when the external side compressors act in the compressing and forming of the barrel-body.

It may be remarked at this point that the core, as a whole, is introduced into the central space formed by the external side compressors and interspace compressors from below, and that it retreats therefrom downward after the barrel-body is formed upon it, bearing that barrel-body with it in the same direction, and at the proper time the core is collapsed by first raising out and withdrawing the core-spine and then moving the core-sections and core-blocks radially inward, after which, of course, the barrel-body is free to be removed.

The core-spine has upon its top or upper end two or more eyebolts, $w$, in which hooks may take, and the core-spine, by proper attachments, be lifted.

In the core-plate $s$ there are four radial mortises, $z$, one for each of the core-blocks, through which runs a bolt, $a'$, connecting each core-block with its rack $b'$, underneath the core-plate, which racks rest and radially move in radial mortises made for that purpose in the under side of the core-plate. The two pinions $c'$ and the rotary shaft which carries them are really and practically one piece. The upper of these pinions meshes into the rack $b'$, and the lower meshes into the ring-gear $d'$, which ring-gear is provided with a socket, into which the operator may insert one end of a lever, $e'$, and by means of this lever he partially rotates the ring-gear $d'$ and moves all of the core-blocks radially inward. In the core-plate are four other radial mortises, $f'$, through which run the bolts $g'$, serving to connect the core-sections with their racks $h'$, lying and moving radially in radial mortises made for that purpose in the under side of the core-plate. The pinion $i$ meshes into the rack $h'$, and also into the ring-gear $j'$. This ring-gear is provided with a socket, into which the operator may insert one end of the lever $k$, and, taking hold of the other end of the lever, he may partially rotate the ring-gear $j'$, and thereby move radially inward all four of the core-sections. When the core is thus collapsed, as already said, the barrel-body is readily removable therefrom.

The plate $l'$ is attached on the bottom of the core-plate by studs, as shown. To this plate $l'$ there is permanently attached the core-shaft $m'$, on and around which the core-spine rests when the parts of the core are assembled for use.

The letter $n'$ denotes a cylinder in which reciprocates the piston $o'$, having attached thereto a piston-rod, $p'$, which is used in effecting the raising and lowering of the core. One mode of coupling this piston-rod last mentioned to the core is to have the upper end of the core-shaft $m'$ socketed in the lower end of the piston-rod $p'$, and the two locked together by a key, $r'$, which can be knocked out when it is desired to disengage the core. The piston $o'$ is operated by water let into and out of its cylinder at appropriate times.

The table $g$ is suitably bolted to the frame-ring. From this table $g$ rises a series of pillars, $s'$, supporting the cap $t'$, which is practically a casting in which are formed the hydraulic cylinder $n'$ and also certain other hydraulic cylinders, shortly to be described hereinafter.

On the table $g$ rests a pulp-reservoir, $u'$, fed with pulp from an elevated tank through a pipe or pipes, $v'$, thus serving to maintain the pulp-reservoir always full of pulp and under pressure; and it is from this pulp-reservoir that the pulp is fed into the matrix which exists between the core and the external side compressors; and for this purpose the ring-gate $w'$ operates at the proper time. Its rising opens a way to such matrix, and its falling closes such way. This ring-gate is operated by means of the hydraulic cylinders $i'$, in which reciprocate the pistons $a''$, attached to the piston-rods $b''$, which are in turn attached to the ring-gate. It is not deemed necessary to describe the details of these last-mentioned hydraulic cylinders further.

It will be understood from the foregoing description of this machine for forming and compressing barrel-bodies what its operation is. That operation is, in short, that the external side compressors and the interspace compressors are in the position of being retracted and the core is in its place in the central space formed by these external side compressors and interspace compressors. Then the ring-gate is raised and pulp allowed to flow into the matrix until it is full, after which the ring-gate is lowered and closed. Then power is applied to the external side compressors, which move forward, radially expressing the water from the pulp to a great degree and giving the pulp the shape of a barrel-body, after which the external side compressors and the interspace compressors are retracted or withdrawn. Then the core, bearing upon it the barrel-body, is lowered and detached from the piston-rod $p'$, another core is attached and lifted into place, and the machine is then ready to repeat the operation already described of forming and compressing another barrel-body.

The plate $l'$, which forms the bottom of the core-plate, is provided with small wheels $c''$, which permit the core, bearing its barrel-body, to be rolled, preferably upon tracks, to the press, shortly now to be described herein, where the barrel body is dried by heat under pressure.

*The drying-press.*—The letter $d''$ denotes what may be termed the "frame-ring" of this machine, although it is practically, in the present instance, made of three different castings connected by strong rods. This frame-ring is supported upon the pillars $e''$.

The letter $f''$ denotes what may be called the "lower table," secured beneath the frame-ring, and the letter $g''$ denotes what may be called the "upper table," attached on the top of the frame-ring. On the top of the upper table there is secured a hydraulic lifting-cylinder, $h''$, carrying the reciprocating piston-head $j''$, from which depends the piston-rod $k''$, which engages with the core-shaft $m'$ when the core, bearing upon it a barrel-body, is brought underneath, the connection being made by having the lower end of the rod $k''$ socketed and shut over and upon the upper end of the core-shaft, the key $r'$ completing the engagement. Then, water being forced into the lifting-cylinder, the piston-head $j''$ rises, lifting the core and the barrel-body it carries into the central space between the external side compressors of this machine.

The external side compressors of this drying-press are preferably three in number; but of course that number may be varied.

The lower table, $f''$, has a raised ring on its upper surface, and the upper table, $g''$, has a similar ring on its lower surface, both of which rings are radially slotted or mortised, which mortises act as guides for the external side compressors as they move toward or from the axis of the barrel-body—a movement conveniently termed their "radial movement."

Each of the external side compressors of the drying-press bears a face-plate, $n''$, of brass or the like, faced with a finely-perforated mold-face. These face-plates are bored laterally through and through from front to rear, and grooved in the rear for the escape of steam from the drying barrel-body. The external side compressors of the drying-press are made practically one with the piston-rods $o''$ by a doweled key, $p''$. These piston-rods $o''$ enter the cylinders $r''$, and are there provided with the piston-heads $s''$. These piston-heads are intended to be operated in both directions by water forced into the cylinders $r''$ upon one or the other side of the piston-heads—that is, these pistons are made use of for putting the pressure on the barrel-body, and also for withdrawing the external side compressors.

It will be understood that after the core, bearing upon it the barrel-body, has been lifted into the central space between the external side compressors, then these external side compressors are moved forward under considerable power, so as to put and keep the barrel-body during the operation which is to follow of drying by heat under a very considerable pressure.

There are joint-flaps $t''$ attached on the one side to the face-plates $n''$, and lapping over the neighboring face-plate, such neighboring face-plate being properly recessed or rabbeted for the purpose. The external side compressors of the drying-press have formed within them ducts or spaces for the circulation of steam or other heating agent, which may well be termed "heat-ducts," which are denoted, so far as these external side compressors are concerned, by the letter $u''$, and the same letter denotes heat-ducts for the same purpose in the parts composing the core.

Each of the external side compressors carries a pipe, $l'''$, which moves back and forth as the compressor moves in a properly-packed sleeve, $m'''$, which is on the end of a pipe, $n'''$, rising from a circular pipe, $o'''$. This pipe $o'''$ carries live steam through pipes $n'''$ and $l'''$ into the heat-ducts of all the external side compressors. The pipes $l'''$ each have an orifice for the entrance of steam coming from pipes $n'''$, such orifices being brought into proper relation for that purpose with the pipes $n'''$ when the external side compressors have moved forward. Now, with the barrel-body under a very considerable pressure, as already described, the steam or other heating agent is caused to circulate through all these heat-ducts, both in the core and in the external side compressors, until the moisture has dried out from the barrel to any desired degree, after which the external side compressors are withdrawn or retracted, the core is let down or dropped underneath, the core collapsed, and the barrel-body removed.

The steam is admitted to the core through a flexible tube, $v''$, or the like, and taken away through a tube, $w''$, or the like, the connections thereof being made after the core and its barrel-body are put under pressure in the drying-machine, and the disconnections thereof being made before the core and its barrel-body are removed from the drying-machine.

The tube $v''$ connects with a pipe, $z''$, carried permanently by the core-spine, which pipe conducts the steam to a steam-chest, $a'''$, at the top of the core-spine, whence it is distributed to the ducts or chambers $u''$, (in the core-sections and core-blocks,) whence it comes into a steam-chest, $b'''$, at the bottom of the core-spine and thence escapes through the tube $w''$. The plate $c'''$ covers the steam-chest $a'''$, and the plate $d'''$ covers the steam-chest $b'''$.

Inside the steam-chest $a'''$ there are horizontally-reciprocating pipes $e'''$. Those which reciprocate radially of the core carry the live steam into the heat-ducts of the core-blocks, and others reciprocating at right angles to radii of the core carry the live steam into the heat-ducts of the core-sections. When retracted, these pipes $e'''$ do not project beyond the sides of the core-spine; but when projected or thrust forward they project slightly beyond the sides of the core-spine and into the sockets or pipe-holes made for them in the sides of the core-blocks and core-sections, making them closely communicate with the heat-ducts in such core-blocks and core-sections.

The letters $f'''$ denote rubber packing (pieces of rubber tube) around the pipes $e'''$, which, when the pipes $e'''$ are thrown out or forward, shut into recesses made for them in the sides of the core-blocks and core-sections, and they are so compressed in this operation as to make the joints steam-tight. These pipes $e'''$ are reciprocated by rotating the disk $g'''$, communicating with the pipes through the medium of the jointed rods $h'''$. The disk $g'''$ is operated from the exterior and below the core by means of the rotary shaft $i'''$, many-sided at the lower end for the application of a wrench or the like, the forked arm fast on shaft $i'''$ and the stud $k'''$ on disk $g'''$.

An apparatus precisely like pipes $e'''$, disk $g'''$, and rods $h'''$ is contained in the lower steam-chest, $b'''$, and it is operated simultaneously with said apparatus in the upper steam-chest by means of the shaft $i'''$, carrying a duplicate of forked arm $j'''$, operating on a duplicate of stud $k'''$.

It will be understood that the pipes $e'''$ and the duplicates in the lower steam-chest are connected with the heat-ducts in the core-blocks and core-sections preparatory to having the live steam circulate in such core-blocks and core-sections, and that these pipes are disconnected before removing the core from the drying-press.

It will be observed that in using this drying-press the article of pulp is under pressure while heat is applied to both sides of the stock, the practical advantages of which are of very great importance, the article being practically of a material differing very widely from ordinary compressed pulp—so widely as to seem to be a substantially other and different thing.

I claim as my improvement—

The process, art, or method of forming and drying articles made from pulp, which consists in forming the article (and expressing the water to a great degree) upon a core in one machine, conveying it on such core to another machine, in such other machine drying it under heat and pressure, substantially as described, and for the purposes set forth.

SAMUEL M. HOTCHKISS.

Witnesses:
CHAS. L. BURDETT,
H. R. WILLIAMS.